March 19, 1946.  C. G. HOLSCHUH ET AL  2,396,701
COMPUTING AIRCRAFT GUN SIGHT
Filed Sept. 26, 1940  2 Sheets-Sheet 2

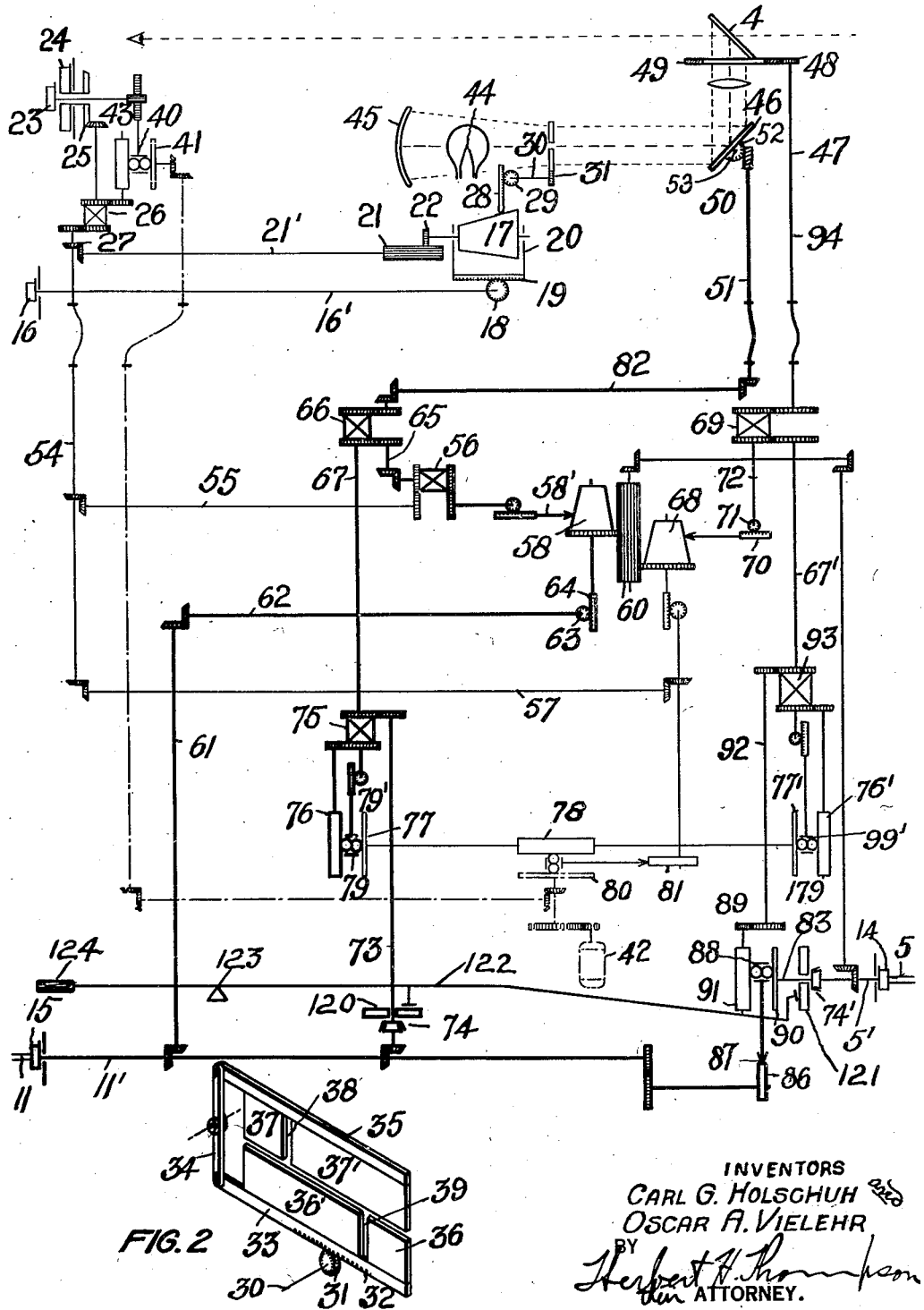

CARL G. HOLSCHUH
OSCAR A. VIELEHR
BY
Herbert H. Thompson
their ATTORNEY

Patented Mar. 19, 1946

2,396,701

UNITED STATES PATENT OFFICE 2,396,701

COMPUTING AIRCRAFT GUN SIGHT

Carl G. Holschuh, Woodridge, N. J., and Oscar A. Vielehr, New York, N. Y., assignors to Sperry Gyroscope Company, Inc., Brooklyn, N. Y., a corporation of New York Application September 26, 1940, Serial No. 358,382

16 Claims. (Cl. 33—49)

This invention relates to simplified fire control instruments especially designed for directing the fire of small caliber guns against rapidly moving targets, such as employed in inter-aircraft fire. In such devices, where the range is comparatively short and lightness and simplicity are essential, by making close approximations the extremely complicated mechanisms of a complete fire control system are reduced to a simple practical device giving sufficient accuracy for the purpose.

By our invention, we combine the range finder with the predictor so that all data necessary is obtained from the one device and the answer applied directly as angular displacement which retards the sight as to the gun position. By our invention we solve for two different types of deflections and combine the same to give the final correction, (1) ballistic deflections due principally to action of the wind on the projectile, and (2) predicted deflections in azimuth and elevation due to the relative motion of the target.

The principal factors which determine ballistic deflections are azimuth position (A) of the gun, elevation position (E), slant range (D), indicated air speed (IAS) and altitude (H). It is considered that a constant wind equal in magnitude to indicated airspeed acts on the projectile during its flight to the target. According to the present invention, we design the mechanism for one air speed, say, 175 miles per hour, and one altitude, say 15,000 feet, representing the maximum air speed and altitude flown under normal operating conditions. Therefore, to determine ballistic deflections only (A), (E) and (D) need be considered. Similarly, for determining prediction deflections in azimuth and elevation, we base the deflection in each on the product of the rate of change of gun position in the appropriate dimension and time of flight of the shell to the present position of the target rather than to the future position, and utilize the gun rates in azimuth (A) and elevation (E) which the operator sets into the gun while tracking. The two corrections are then combined to give the angular difference between the line of sight of the target and the gun.

Referring to the drawings, showing the preferred form our invention may assume,

Fig. 1 is a diagram illustrating the layout of the principal parts of our invention.

Fig. 2 is a perspective view of the adjustable slides in the optical system by which range is determined.

Figure 3:
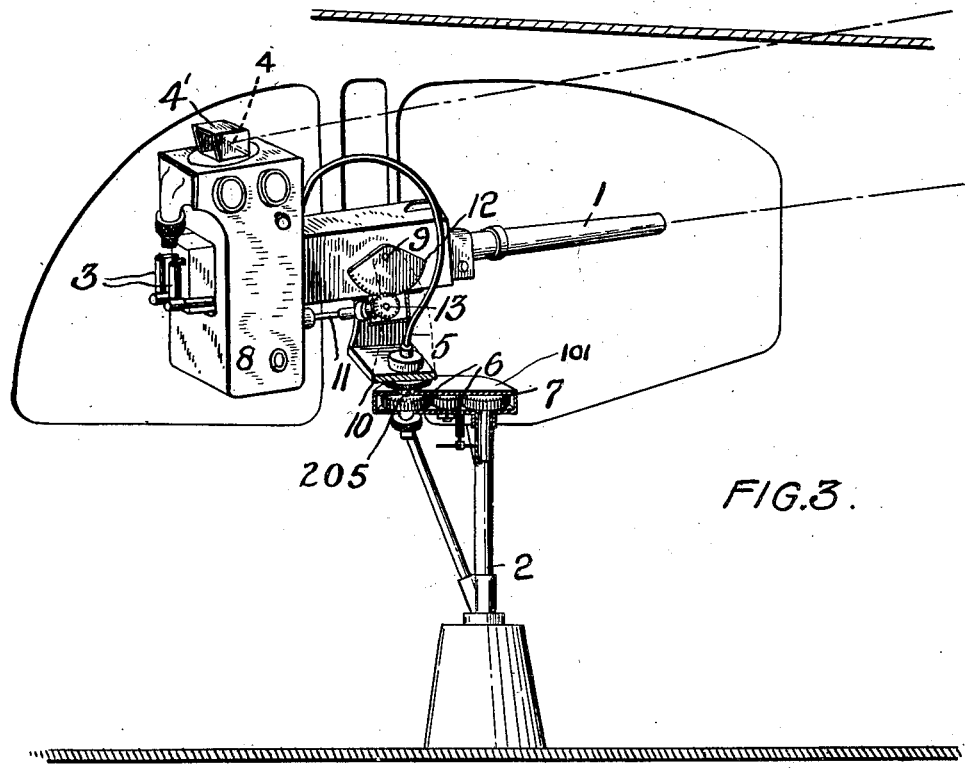
Fig. 3 is a perspective view of our invention as applied to a gun.
Figure 5:
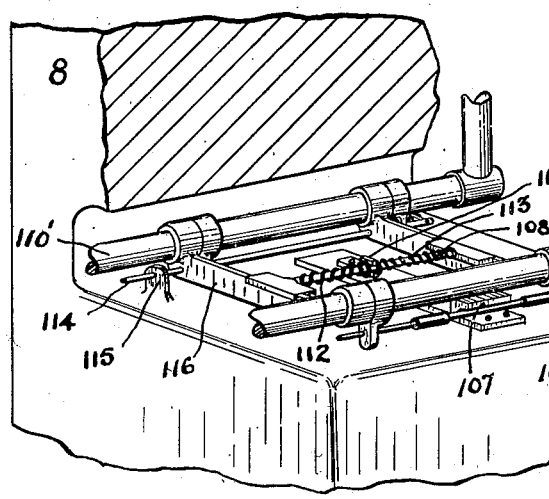
Fig. 5 is a detailed view in perspective, showing the spring or shock mounting of the sight on the gun.
Figure 4:
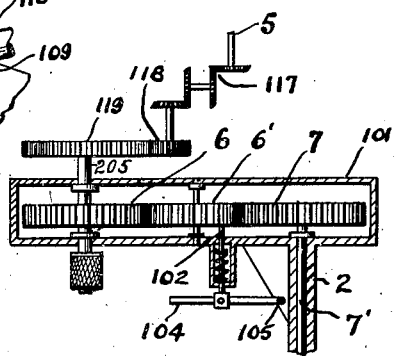
Fig. 4 is a detailed sectional view of the gearing connecting the gun and its stand.
Figure 6:
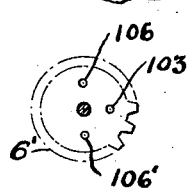
Fig. 6 is a plan view of a gear.

As shown in Figs. 3 and 5, the computing or predictor sight mechanism is enclosed within a U-shaped box 8 adapted to slidably fit over the rear end of the gun 1. The gun is shown as mounted for rotation about the vertical axis of shaft 205 journaled within a housing 101 rotatably mounted on standard 2. Within the housing is shown three gears 6, 6' and 7, the first being mounted on shaft 205, 7 being fixed to the stationary shaft 7', and the gear 6' being an idler connecting gears 6 and 7. The idler is normally locked, thereby preventing rotation of any of the gear train by means of a spring pressed pin 102 normally engaging a central depression 103 (Fig. 6) in the under face of gear 6'. By this means the entire housing 101 is locked in the position shown in Fig. 3. If, however, it is desired to swing the housing and the gun through 90° in either direction to bring it nearer the window for greater range of fire, this may be done by temporarily depressing the handle 104 secured to pin 102 and pivoted at 105 to stand 2. The housing 101 and gun may therefore be swung until the pin engages one or the other of depressions 106 or 106' in gear 6' to thereby lock the gun in either of these positions.

In placing the sight on the rear of the gun, the open end of the U-shaped housing 8 is pushed over the gun proper until a V-shaped notch 107 engages a rod 108 held in brackets 109 on a recoil shaft 110 fixed to the gun. At the same time a second V-shaped member 111 on the sight engages a second rod 108' between compression springs 112 and 113. A detachable rod 114 is then slipped in place through ears 115 on the sight and through holes in brackets 116 on a second recoil shaft 110'. The springs 112, 113 constitute shock absorbing means forming with the mass of the sight a mechanical filter between the sight and the gun which supplements the usual recoil mechanism (not shown) to prevent damage to the sight during gunfire.

The gun as a whole is rotated in both azimuth and elevation by means of the hand grips 3 on shafts 110 and 110', the gunner viewing the target through a thinly silvered mirror or inclined plate glass 4 rotatably mounted on top of the sight within housing 4'. Reticle lines visible simultaneously with the target, as hereinafter described, furnish reference marks determining the line of sight to the target. As the gun is swung in azimuth, shaft 5 is rotated by a gear connection 117 to a pinion 118 meshing with a fixed gear 119 on the shaft 205 of gear 6, the shaft 5 leading within the box 8. The gun is shown as trunnioned on horizontal pivots 9 pivoted in bracket 10, and as the gun is moved in elevation, a gear sector 12 on said trunnions rotates the pinion 13 on shaft 11, which also enters the box 8. The sight proper, including the glass 4 and its housing 4', is rotatably mounted on a vertical axis on top of the box 8.

Referring now to Fig. 1, the shafts 5 and 11 are represented as entering the mechanism through couplings 14 and 15, respectively, so that as the gun is moved in azimuth the shaft 5' is turned, and as the gun is moved in elevation the shaft 11' is turned. The operator, after getting the sights on the target by moving the gun, first adjusts a knob 16 to a scale in accordance with the known target dimension of the target. The target dimensions of all types of craft are usually known and may be considered as constant for all angles from which the target is usually observed. The setting of the knob 16 positions in one dimension, say axially, the three-dimensional cam 17 by means of a pinion 18 on the shaft 16' of knob 16, which pinion meshes with a rack 19 which carries the bracket 20 rotatably supporting the cam. The cam is shown as rotated by means of a long pinion 21 meshing with a pinion 22 on the shaft of the cam. The pinion 21 is in turn positioned from either or both of the range knobs 23 and 24. The knob 24 is shown as directly positioning the shaft 21' of pinion 21 through bevel gears 25, differential 26 and bevel gears 27. As the cam is positioned in rotation and translation, the lift of the pin 28 thereon is varied to rotate a pinion 29 on shaft 30. A second pinion 31 thereon meshes with rack teeth 32 in a bar 33 hinged at one end to a lever 34 (Fig. 2). A similar bar 35 is hinged at the other end of said lever and each bar carries one of plates 36, 36' and 37, 37', there being a vertical space or slot between each bar and plate, which spaces are laterally displaced as shown in Fig. 2. It will be readily apparent that by rotating the pinion 31, the two pairs of plates may be shifted laterally with respect to each other, thereby varying the space between the vertical slots 38 and 39. The operator then adjusts the knob 24 until the slots 38 and 39 circumscribe the target. Since the target is assumed to be moving rapidly, the operator then adjusts the knob 23 in order to set up the proper variable speed drive to maintain the slots spaced properly. Turning of the knob 23, it will be seen, varies the effective radius of the ball carriage 40 which is driven from the disc 41 rotated at constant speed from a constant speed motor 42. The driven cylinder 43 therefore is driven at a velocity proportional to the adjustment, which, in turn, drives the third arm of the differential 26 which continues to reposition the elongated pinion 21.

Behind slots 38 and 39 is shown a light source 44 and a reflector 45 to project the image of the slots on the mirror 46, which in turn projects the image upon the plate glass 4. The mirror and the plate glass of course move with the gun in azimuth and elevation and both are also shown as provided with independent adjustment. The future azimuth is shown as set in through the shaft 47 which rotates the pinion 48 meshing with the teeth on the rotatable platform 49 carrying the plate glass 4. The mirror 46, on the other hand, is shown as tilted in elevation from a worm 50 on the shaft 51, which worm meshes with a worm sector 52 which tilts the mirror around its horizontal axis 53.

The angular position of the cam 17 represents slant range (D) and this quantity is fed into the computer from shaft 54, being fed into the elevation correction mechanism through the shaft 55 and differential 56 and into the azimuth mechanism through the shaft 57.

If the machine is designed for one indicated air speed (IAS) and altitude (H), as before stated, the vertical deflection due to the wind (superelevation $\phi$) may be expressed as $\phi = f(A, E, D)$, but it is also found that without introducing serious error, an arbitrary relationship may be assumed between D and $\phi$ (which may in some cases be taken as a linear one) so that a three-dimensional cam 58 may be used to solve for $\phi' = F(A, E)$ at a constant range. Then $\phi = \phi' + D$. This addition is accomplished by adding the lift of the cam pin 58' to range through the differential 56 above referred to. The cam 58 is shown as rotated from a long pinion 60 turned from the azimuth shaft 5' to introduce (A), while the said cam is shown as axially positioned directly from the shaft 11' through intermediate shafts 61, 62, pinion 63 and rack 64 to introduce (E). The lift of the pin therefore represents $\phi'$, which is added to (D) to produce $\phi$, representing the rotation of the middle arm of the differential 56 which is transmitted through shaft 65 to a second differential 66, where the predicted deflection in elevation, obtained as hereinafter described, is added as introduced from the shaft 67.

The ballistic or wind reflection in azimuth may be obtained as a direct function of (A) and (D). In other words, (E) may be omitted. Therefore we may position three-dimensional cam 68 rotationally from the same pinion 60 which positions the cam 58, and we position cam 68 axially from the shafts 54 and 57 in accordance with (D). The lift of the pin therefore, if the cam is properly laid out, represents ballistic correction $\theta$ which is introduced into the differential 69 from the rack bar 70 on the cam pin, pinion 71 and shaft 72.

In order to obtain the predicted deflections, the multiplication of the gun rates in azimuth and elevation by the time of flight is performed automatically in two variable speed units and two differentials. In elevation, the rotation of the shaft 11' rotates the shaft 73 through a slip friction or smoothing clutch 74 to give smooth motion, and the shaft 73 turns one arm of a differential 75. The second arm of said differential is positioned from the driven cylinder 76 of the variable speed device 79' which is employed as a mechanical integrator to obtain a displacement proportional to angular elevation rate. The driving disc 77 of device 79' is rotated from a second variable speed device 78. The intermediate ball carriage 79 is positioned from the third arm of the differential 75 until a balanced position is reached.

The variable speed device 78 is shown as having the disc 80 driven at a constant speed from the motor 42, while the ball carriage is positioned from a flat cam 81 which is so laid out as to convert slant range (D) into a factor inversely proportional to the time of flight $$\left(\frac{1}{t}\right)$$

With sufficient accuracy $$\frac{1}{t}$$

may be taken as a function of range (D). Therefore the disc 77 is rotated at a speed proportional to $$\frac{1}{t}$$

and the variable speed mechanism in effect divides elevation rate ($E_r$) by $$\frac{1}{t}$$

or, in other words, multiplies the angular elevation rate by time of flight, so that the position of ball carriage 79 represents predicted deflection in elevation. This is transmitted through the shaft 67 to the differential 66, where the ballistic deflection is added and the final correction in elevation transmitted through shafts 82 and 51 to position mirror 46 in elevation.

Likewise, in azimuth, the disc 77' of the integrator 179 is rotated in proportion to $$\frac{1}{t}$$

Likewise, the rotation of the shaft 5' is transmitted through a smoothing clutch 74' to shaft 83. Since the azimuth rate of the gun is measured in the horizontal plane and the azimuth deflection offsets the glass plate 4 in the slant plane, it is necessary to convert the azimuth rate in the horizontal plane to its corresponding rate in the slant plane. For this purpose we position an elevation cosine cam 86 on the shaft 11', which in turn positions from the cam pin 87 the ball carriage 88 of the variable speed drive 89, the disc 90 of said drive being turned from the gun azimuth shaft 83 and the driven cylinder 91, turning through shaft 92 one arm of the differential 93. Said differential corresponds to the differential 75 previously described. Differential 93 and variable speed device 179, in combination, compute the angle of lead or prediction in the slant plane. The rate of change of displacement introduced into one arm of differential 93 by shaft 92 is proportional to the rate of change of the angular displacement of target position, in the slant plane, while disc 77' is rotated from drum 78 at a rate inversely proportional to time of flight of the projectile. According to the known functioning of the interconnected differential and variable speed drive, ball carriage 99' is therefore displaced from its central position in proportion to the quotient of said two quantities, that is proportional to slant plane prediction. The shaft 67', which is angularly displaced in proportion to the offset of ball carriage 99', is therefore turned in accordance with the predicted deflection in the slant plane ($A_r \times t$), and this deflection is added to the ballistic deflection in azimuth through the differential 69 and transmitted thence to the shaft 94 to rotate the pinion 48.

In order to prevent violent displacement of the sight by the rate-actuated prediction mechanism when the gun is slewed and suddenly stopped in rapidly getting on a target, friction brakes 120 and 121 are provided on shafts 73 and 83, respectively, which, when actuated, prevent the prediction mechanisms from functioning. Thus, brake 120, when its members are engaged, prevents rotation of shaft 73 by causing slippage at clutch 74 and so prevents any elevation prediction being fed in by way of shaft 67 while brake 121 prevents rotation of shaft 83 by causing slippage at clutch 74' and so prevents slant plane prediction being fed in by way of shaft 67'. The two brakes are simultaneously controlled by lever 122, having a fulcrum at 123 and terminating at one end in operating handle 124 located near one of hand grips 3 for operation by one or more fingers without removing the hand from the grip.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. Apparatus for converting angular velocity of a body about one axis to equivalent angular velocity about an intersecting axis, comprising a variable speed device having a rotatable input member, a rotatable output member and a positionable intermediate member supplying a driving connection between said first two members, the speed of said output member being jointly dependent upon the speed of said input member and the position of said intermediate member, means for rotating said input member at a speed proportional to angular velocity about said first axis, and means for positioning said intermediate member in accordance with the cosine of the angle between said two axes, whereby said output member is caused to rotate at a speed proportional to angular velocity about said second axis.

2. Apparatus for directing gunfire against a mobile target, comprising means supporting said apparatus for rotation about two axes for the purpose of tracking a target, a sight carried by said apparatus for defining a line of sight to said target, a device actuated by movement of said apparatus when tracking a target according to the rate of rotation thereof about one of said axes, a device responsive to movement of said apparatus about a second of said axes when tracking a target for determining a cosine function of angular displacement thereof about said second axis, multiplying means actuated jointly by said devices according to said rate of rotation and said cosine function of angular displacement for converting said rate of rotation to a plane including the position of said apparatus and a component of the path of said target parallel to said second axis, and a mechanism responsive to said multiplying means for displacing said line of sight relative to said apparatus.

3. Apparatus for directing gunfire against a movable target, comprising means supporting said apparatus for rotation about two axes for the purpose of tracking a target, a sight carried by said apparatus for defining a line of sight to said target, a device actuated by movement of said apparatus during a target tracking operation according to the rate of rotation thereof about one of said axes, a device responsive to movement of said apparatus about a second of said axes during a tracking operation for determining a cosine function of angular displacement about said second axis, multiplying means actuated jointly by said devices according to said rate of rotation and said cosine function for determining a prediction angle measured in a plane including the position of said apparatus and a component of the path of said target parallel to said second axis, and mechanism responsive to said multiplying means for displacing said line of sight relative to said apparatus in accordance with said prediction angle.

4. Apparatus for directing gunfire against a mobile target, comprising means supporting said apparatus about two axes for rotation in azimuth and elevation for the purpose of tracking a target, a sight carried by said apparatus for defining a line of sight to a target, a device actuated according to azimuth movement of said apparatus during a target tracking operation for determining the azimuth rate of rotation thereof about one of said axes, a device responsive to movement of said apparatus about a second of said axes during said target tracking operation for determining a cosine function of the present elevation angle, multiplying means actuated jointly by said device according to said azimuth rate and said cosine function for converting said rate to a plane including the position of said apparatus and a component of the path of said target parallel to said second axis, and mechanism responsive to said multiplying means for displacing said line of sight relative to said apparatus.

5. Apparatus for directing gunfire against a mobile target, comprising means supporting said apparatus for rotation about two axes for the purpose of tracking a target, a sight carried by said apparatus for defining a line of sight to a target, a device actuated by movement of said apparatus during a target tracking operation for determining the rate of rotation about one of said axes, a second device responsive to movement of said apparatus about a second of said axes during said tracking operation for determining the rate of rotation about said second axis, a third device responsive to movement of said apparatus about said second axis for determining a cosine function of the angular displacement about said second axis, multiplying means actuated jointly by said first and third devices according to said rate and said angular displacement for converting said rate to a plane including the position of said apparatus and a component of the path of said target parallel to the path of said second axis, and mechanism actuated jointly by said multiplying means and said second device for displacing said line of sight relative to said apparatus.

6. Apparatus for directing gunfire against a mobile target, comprising means supporting said apparatus for rotation about two axes for the purpose of tracking a target, a sight carried by said apparatus for defining a line of sight to a target, a device actuated by movement of said apparatus during a target tracking operation according to the rate of rotation thereof about one of said axes, a second device responsive to movement of said apparatus about a second of said axes during said target tracking operation for determining a cosine function of angular displacement about said second axis, multiplying means actuated jointly by said devices according to said rate of rotation and said cosine function for converting said rate to a plane including the position of said apparatus and a component of the path of said target parallel to the path of said second axis, means actuated by said multiplying means, for computing a prediction angle measured in said plane, further means responsive to said movement of the apparatus about the second axis for computing a prediction angle in a plane perpendicular to the second axis, and a mechanism actuated by the two last mentioned means for displacing said line of sight relative to said apparatus according to said prediction angles.

7. Apparatus for directing gunfire against a mobile target, comprising means rotatably mounting said apparatus about two axes for movement in azimuth and elevation for use in tracking a target, a sight carried by said apparatus for guiding the rotary movement of said apparatus in tracking a target, a device actuated by movement of said apparatus about one of said axes during a target tracking operation for determining the azimuth rate of rotation thereof, a second device responsive to movement of said apparatus about a second of said axes during said target tracking operation for determining a cosine function of an elevation angle thereof, multiplying means actuated jointly by said devices according to said azimuth rate and said cosine function for computing a prediction angle measured in the lateral plane including the position of said apparatus and a lateral component of the path of said target, a third device actuated by said movement of said apparatus about said second axis for determining the elevation rate of rotation, means actuated by the third device for computing an elevation prediction angle, and a mechanism jointly actuated by the last mentioned means and said multiplying means for moving said sight relative to said apparatus according to said prediction angles.

8. Apparatus for directing gun fire including a gun and a sight therefor of the displaced type for anti-aircraft use and a calculating mechanism for determining azimuth and elevation prediction angles of a target, said apparatus also comprising support means for the gun and sight adapted to permit their rotation in azimuth and in elevation for target tracking purposes, a pair of members coupling the support means and calculating mechanism, a first of the members being proportionately displaceable by the rotary movement of the apparatus in azimuth and the other of the members being similarly displaceable by movements of the apparatus in elevation, a cosine member driven by the last-mentioned member so as to be continuously displaced according to the cosine function of the present elevation angle, a mechanism having one input regulated by said cosine member and another input displaced by said first member, an output for said mechanism, said mechanism being arranged to displace its output in proportion to the azimuth rate of the target in a slant plane; a range finding device in said sight including a member visually adjusted in proportion to range for target sighting purposes, means controlled by adjustment of the last-mentioned member for providing a continuous measure of slant range, a shaft, a device adjusted by the last-mentioned means in proportion to the slant range, said device cooperating with said last-mentioned means to displace said shaft continuously in proportion to time of flight, means controlled by said shaft and also by the output of the last-mentioned mechanism for displacing the sight in azimuth with respect to the gun bore whereby the latter is automatically positioned in accordance with the azimuth prediction angle in a slant plane as the target is tracked by said sight.

9. Apparatus for directing gun fire including a gun and a sight therefor of the displaced type for anti-aircraft use and a calculating mechanism for determining azimuth and elevation prediction angles of a target, said apparatus also comprising support means for the gun and sight adapted to permit their rotation in azimuth and in elevation for target tracking purposes, a pair of members coupling the support means and calculating mechanism, a first of the members being proportionately displaceable by the rotary movement of the apparatus in azimuth and the other of the members being similarly displaceable by movements of the apparatus in elevation, a cosine member driven by the last-mentioned member so as to be continuously displaced according to the cosine function of the present elevation angle, a mechanism having one input regulated by said cosine member and another input displaced by said first member, an output for said mechanism, said mechanism being arranged to displace its output in proportion to the azimuth rate of the target in a slant plane; a range finding device in said sight including a member visually adjusted in proportion to range for target sighting purposes, means controlled by adjusting the last-mentioned member for providing a continuous measure of time of flight, means controlled by the last-mentioned means and also by the last-mentioned mechanism for displacing the sight in azimuth with respect to the gun bore whereby the latter is automatically positioned in accordance with the azimuth prediction angle in a slant plane, while the target is tracked by said sight.

10. An apparatus for directing gun fire including a gun and a displaceable sight therefor together with a calculating mechanism for determining elevation and azimuth predictional angles of a target, said apparatus comprising support means for the gun and sight adapted to permit their rotation in azimuth and elevation for target tracking purposes, a pair of members coupling the support means and calculating mechanism, a first of said members being proportionally displaced by the rotary movement of the apparatus in azimuth and the other of said members being proportionately displaced by the rotary movement of the apparatus in elevation, a cam operatively connected for proportional movement to the last-mentioned member, a follower for said cam, said cam being formed so as to move its follower in proportion to the cosine function of the present elevational angle of said apparatus, a variable speed device comprising a disc driven by the first of said members, a ball carriage positioned by said cam follower, and a third member actuated thereby, and means actuated by the adjusted position of said third arm for effecting an alteration in the angular relation of said sight and the bore of said gun.

11. An apparatus for directing gun fire including a gun and a displaceable sight therefor together with a calculating mechanism for determining elevation and azimuth predictional angles of a target, said apparatus comprising support means for the gun and sight adapted to permit their rotation in azimuth and elevation for target tracking purposes, a pair of members coupling the support means and calculating mechanism, a first of said members being proportionally displaced by the rotary movement of the apparatus in azimuth and the other of said members being proportionately displaced by the rotary movement of the apparatus in elevation, a cam operatively connected for proportional movement to the last-mentioned member, a follower for said cam, said cam being formed so as to move its follower in proportion to the cosine function of the present elevational angle of the gun, a first variable speed device comprising a disc driven by the first of said members, a ball carriage positioned by said cam follower and an output shaft actuated thereby; a second variable speed device comprising a disc driven by a constant speed motor, a ball carriage, means for positioning the last-mentioned ball carriage in proportion to slant range, an output shaft for the second variable speed device, means for computing the prediction angle in a slant plane comprising a third variable speed device and a co-operating differential operated jointly from the output shafts of the first and second variable speed devices whereby the output shaft of the last-mentioned differential is displaced according to the azimuth prediction angle and means actuated by the displacement of the last-mentioned output shaft for effecting an alteration in the angular relation of sight and gun.

12. An apparatus for directing gun fire including a gun and a displaceable sight therefor together with a calculating mechanism for determining elevational and azimuth predictional angles of a target, said apparatus comprising support means for the gun and sight adapted to permit their rotation in azimuth and elevation for target tracking purposes, a pair of members coupling the support means and calculating mechanism, a first of said members being proportionally displaced by the rotary movement of the apparatus in azimuth and the other of said members being proportionately displaced by the rotary movement of the apparatus in elevation, a cam operatively connected for proportional movement to the last-mentioned member, a follower for said cam, said cam being formed so as to move its follower in proportion to the cosine function of the present elevational angle of the gun, a first variable speed device comprising a disc driven by the first of said members, a ball carriage positioned by said cam follower and an output shaft actuated thereby; a second variable speed device comprising a disc driven by a constant speed motor, a ball carriage, means for positioning the last-mentioned ball carriage in proportion to slant range, an output shaft for the second variable speed device, means for computing the prediction angle in a slant plane comprising a third variable speed device and a co-operating differential operated jointly from the output shafts of the first and second variable speed devices whereby the output shaft of the last-mentioned differential is displaced according to the azimuth prediction angle, means actuated by the displacement of the last-mentioned output shaft for effecting an alteration in the angular relation of sight and gun, a three-dimensional cam and a lift pin therefor, said cam being laid out so as to actuate the lift pin according to a ballistic correction, a coupling between said cam and the first of said members whereby said cam is moved in one dimension in accordance with the azimuth angle, means for moving said cam in another dimension in proportion to slant range and means jointly operated by said lift pin and the last-mentioned output shaft for effecting an alteration in the angular relation of sight and gun.

13. An apparatus for directing gun fire including a gun and a displaceable sight therefor together with a calculating mechanism for determining elevation and azimuth predictional angles of a target, said apparatus comprising support means for the gun and sight adapted to permit their rotation in azimuth and elevation for target tracking purposes, a pair of members coupling the support means and calculating mechanism, a first of said members being proportionally displaced by the rotary movement of the apparatus in azimuth and the other of said members being proportionately displaced by the rotary movement of the apparatus in elevation, a cam operatively connected for proportional movement to the last-mentioned member, a follower for said cam, said cam being formed so as to move its follower in proportion to the cosine function of the present elevational angle of the gun, a first variable speed device comprising a disc driven by the first of said members, a ball carriage positioned by said cam follower and an output shaft actuated thereby; a second variable speed device comprising a disc driven by a constant speed motor, a ball carriage, means for positioning the last-mentioned ball carriage in proportion to slant range, an output shaft for the second variable speed device, means for computing the prediction angle in a slant plane comprising a third variable speed device and a cooperating differential operated jointly from the output shafts of the first and second variable speed devices whereby the output shaft of the last-mentioned differential is displaced according to the azimuth prediction angle, means actuated by the displacement of the last-mentioned output shaft for effecting an alteration in the angular relation of sight and gun, and means effective between the last-mentioned output shaft and said sight for modifying said alteration according to a ballistic component.

14. An apparatus for directing gun fire including a gun and a displaceable sight therefor together with a calculating mechanism for determining elevation and azimuth predictional angles of a target, said apparatus comprising support means for the gun and sight adapted to permit their rotation in azimuth and elevation for target tracking purposes, a pair of members coupling the support means and calculating mechanism, a first of said members being proportionally displaced by the rotary movement of the apparatus in azimuth and the other of said members being proportionately displaced by the rotary movement of the apparatus in elevation, a cam operatively connected for proportional movement to the last-mentioned member, a follower for said cam, said cam being formed so as to move its follower in proportion to the cosine function of the present elevational angle of the gun, a first variable speed device comprising a disc driven by the first of said members, a ball carriage positioned by said cam follower and an output shaft actuated thereby; a second variable speed device comprising a disc driven by a constant speed motor, a ball carriage, means for positioning the last-mentioned ball carriage in proportion to slant range, an output shaft for the second variable speed device, means for computing the prediction angle in a slant plane comprising a third variable speed device and a cooperating differential operated jointly from the output shafts of the first and second variable speed devices whereby the output shaft of the last-mentioned differential is displaced according to the azimuth prediction angle, means actuated by the displacement of the last-mentioned output shaft for effecting an alteration in the angular relation of sight and gun, a three-dimensional cam and a lift pin therefor, said cam being laid out so as to actuate the lift pin according to a ballistic correction, a coupling between said cam and the first of said members whereby said cam is moved in one dimension in proportion to the azimuth angle, means for moving said cam in another dimension in proportion to slant range, a differential having one arm coupled to said lift pin, another arm coupled to the output shaft of the first-mentioned differential, and a third arm operatively connected to said sight to effect proportionate displacement thereof in respect to the gun bore.

15. An apparatus for directing gun fire including a gun, a displaceable sight therefor, together with a calculating mechanism for determining elevation and azimuth prediction angles of a target, said apparatus comprising support means for the gun and sight adapted to permit their rotation in azimuth and elevation for target tracking purposes, a pair of members coupling the support means and calculating mechanism, a first of said members being proportionately displaced by the rotary movement of the apparatus in azimuth and the other of said members being proportionately displaced by the rotary movement of the apparatus in elevation, means jointly controlled by these members so as to be displaced in proportion to the cosine function of the present elevational angle of said apparatus, a differential having one input operatively connected to said means, a multiplier comprising a disc, ball carriage and a cylinder driven thereby, means for driving said disc in proportion to the reciprocal of the time of flight, a shaft coupling said cylinder to a second input of said differential, a mechanism driven from the differential for positioning the ball carriage in proportion to slant range prediction whereby the output of the differential is displaced in accordance with the predicted deflection in a slant plane and means coupled to said output for displacing the sight in respect to the bore of the gun.

16. An apparatus for directing gun fire including a gun, a displaceable sight therefor, together with a calculating mechanism for determining elevation and azimuth prediction angles of a target, said apparatus comprising support means for the gun and sight adapted to permit their rotation in azimuth and elevation for target tracking purposes, a pair of members coupling the support means and calculating mechanism, a first of said members being proportionately displaced by the rotary movement of the apparatus in azimuth and the other of said members being proportionately displaced by the rotary movement of the apparatus in elevation, means jointly controlled by these members so as to be displaced in proportion to the cosine function of the present elevational angle of said apparatus, a differential having one input operatively connected to said means, a multiplier comprising a disc, a cooperating ball carriage and cylinder, a range finding device in said sight including an element adjustable in proportion to range for target sighting purposes, means controlled in part by this element for driving the disc of the multiplier in proportion to the reciprocal of time of flight, a shaft coupling the cylinder to a second input of the differential, a mechanism driven from the differential for positioning the ball carriage in proportion to slant range prediction whereby the output of the differential is displaced in accordance with the predicted deflection in a slant plane and means coupled to said output for displacing the sight in respect to the bore of the gun.

CARL G. HOLSCHUH.
OSCAR A. VIELEHR.